No. 645,407. Patented Mar. 13, 1900.
A. J. TIBBITS.
COLD STORAGE APPARATUS OR SYSTEM.
(Application filed June 30, 1899.)
(No Model.) 2 Sheets—Sheet 2.
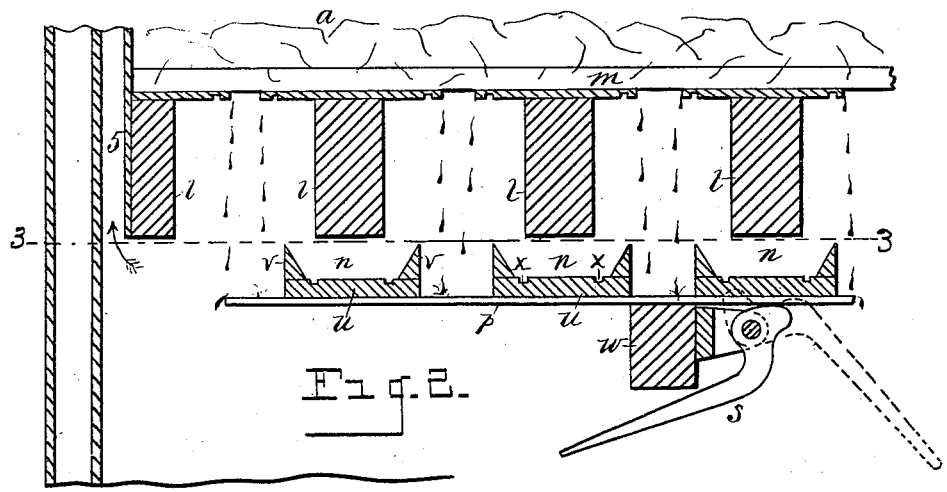
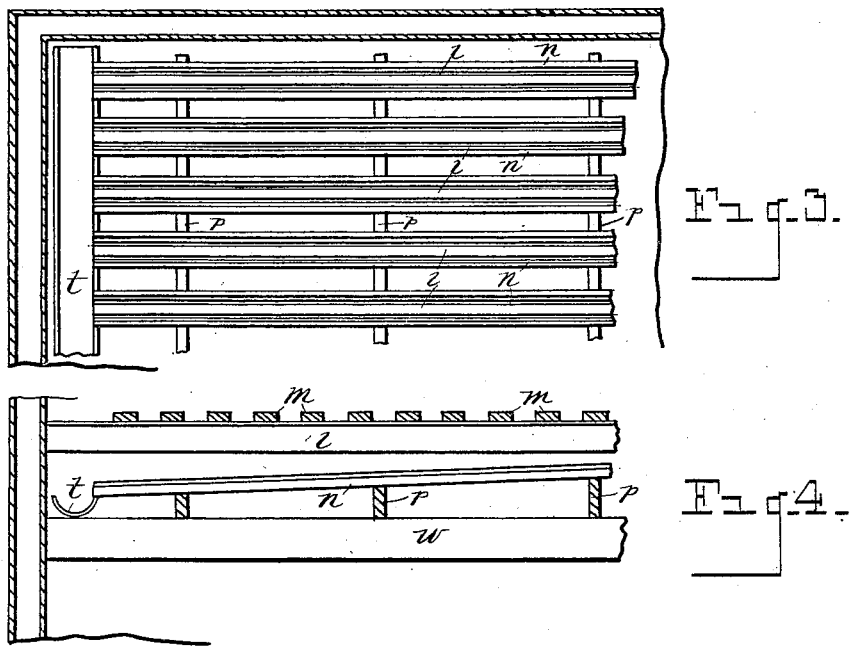
WITNESSES.
O. B. Barnziger
M. Hickey,
INVENTOR.
Artemus J. Tibbits
By Newell S. Wright
His Attorney

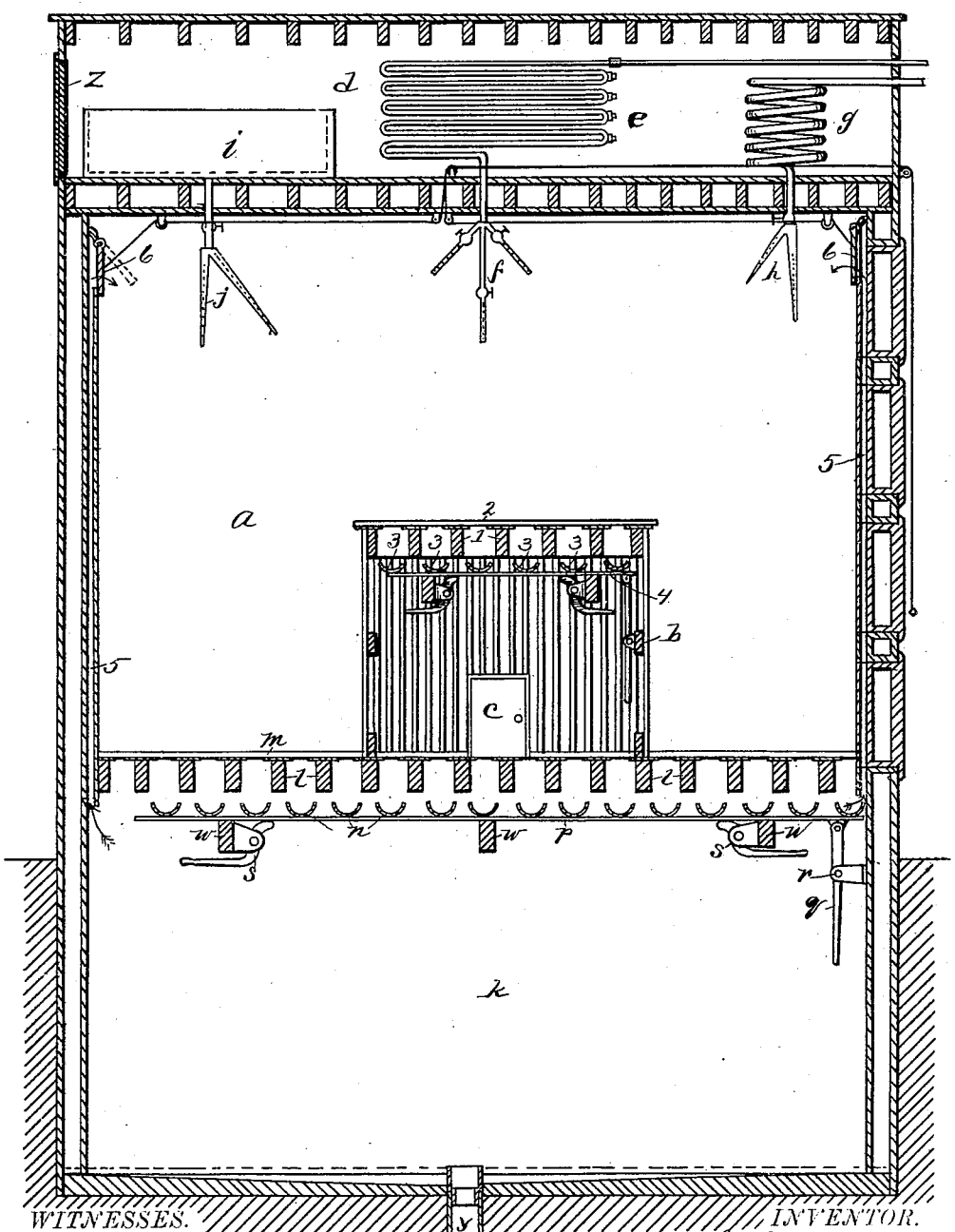

UNITED STATES PATENT OFFICE.

ARTEMUS J. TIBBITS, OF SOUTHFIELD, MICHIGAN.

COLD-STORAGE APPARATUS OR SYSTEM.

SPECIFICATION forming part of Letters Patent No. 645,407, dated March 13, 1900.

Application filed June 30, 1899. Serial No. 722,410. (No model.)

*To all whom it may concern:*

Be it known that I, ARTEMUS J. TIBBITS, a citizen of the United States, residing at Southfield, county of Oakland, State of Michigan, have invented certain new and useful Improvements in a Cold-Storage Apparatus or System; and I declare the following to be a full, clear, and exact description of the invention, such as will enable others skilled in the art to which it appertains to make and use the same, reference being had to the accompanying drawings, which form a part of this specification.

My invention has for its object certain new and useful improvements in a cold-storage apparatus; and it consists of the construction, combination, and arrangement of devices hereinafter described and claimed, and illustrated in the accompanying drawings, in which—

Figure 1 is a view in vertical section showing parts in elevation, illustrating parts of my invention. Fig. 2 is a partial vertical section, on an enlarged scale, illustrating features of my invention. Fig. 3 is a partial sectional view on the line 3 3, Fig. 2. Fig. 4 is a view in vertical section at right angles to the view illustrated in Fig. 2.

My invention is designed to provide a cold-storage apparatus or system wherein a refrigerating-chamber may either be kept moist or dry at the will of the operator. It is well understood that some products desired to be kept in cold-storage should be kept moist, various products requiring to be kept also at different degrees of moisture. Other products need to be kept dry while in cold-storage. Some fruits and some vegetables also can be more satisfactorily kept with cold water dripping upon them. Other fruits would spoil if water were allowed to drip thereupon. Some fruits simply need to be kept damp or in a damp atmosphere. Potatoes, for example, will stand a continual drip of water thereupon, as will oranges and lemons, while such vegetables and fruits will not keep in a dry storage. Apples, for example, in a dry-storage chamber, if they keep at all, lose their flavor; but in moist storage the results are satisfactory. Eggs cannot be kept in a dry storage, as another example, for in that case they will evaporate, but can be satisfactorily kept in moist storage. Other products can be better kept by having water flowing about them. The desirability of a cold-storage apparatus or system which will enable the operator to keep a storage-chamber either dry or moist at will is obvious, as by such an apparatus or system the various advantages of dry storage, moist storage, and of water dripping through the chamber may be secured in one apparatus.

In carrying out my invention an ice-chamber is indicated at $a$, provided with a cooling-chamber $b$, partly surrounded by the chamber $a$, as upon three side of the chamber $b$, the same being provided with a suitable entrance or door $c$, which may open to the exterior. Above the ice-chamber is an apartment $d$, within which may be located any suitable apparatus for properly introducing cold water into the chamber $a$.

To fill the chamber $a$ with ice is an important feature of my invention. To accomplish this end, my invention contemplates icing the chamber $a$ or filling the same with ice in cool weather, as in freezing weather of winter, by simply injecting or distributing water into the chamber $a$, preferably in the form of spray, cooled as much as possible before its introduction into the icing-chamber. To this end the chamber $d$ may be provided with a suitable entrance or door thereinto, or similar opening, (indicated at $z$,) to admit cold air from the exterior into said chamber. A coil of pipe is indicated at $e$, which may be connected with a city water system and which may be provided with any desired distributing apparatus (indicated at $f$) to distribute the water into the chamber $a$. The distributing apparatus $f$ may consist of a series of arms or jets, as indicated. A differently-arranged coil of pipes is indicated at $g$, terminating with any suitable distributing device $h$ within the chamber $a$.

Where a cold storage is desired to be erected out of reach of a city water system, a suitable water-tank (indicated at $i$) may be provided with a distributing device $j$. By such an apparatus or analogous device it is evident that in freezing weather the air about the coils $e$ and $g$ or the tank $i$ will cool the water distributed into the chamber $a$, so that the water so distributed, preferably in the form of spray, will freeze within the chamber $a$ and gradually fill said chamber with solid ice. The icing of the chamber $a$ in this manner can obviously be accomplished in a very economical manner. The ice so formed will surround the portions of the cooling-chamber $b$ located within the ice-chamber. The chamber $b$ is preferably constructed simply of upright joists or timbers, the chamber $b$ opening thus into the chamber $a$. The chamber $b$, however, may be covered in a manner hereinafter to be described while the chamber $a$ is being filled with ice, so that ice will not form within the chamber $b$ unless desired to a certain extent.

Beneath the ice-chamber $a$ is a cooling or a refrigerating chamber $k$. The flooring between the chambers $a$ and $k$ may be constructed of open-work, so that the two chambers will communicate the one with the other. Thus I prefer to construct the flooring between said chambers of timbers or joists $l$, extending across the room in one direction, with additional strips or timbers $m$ extending across the timbers $l$, as indicated in the drawings. Openings will thus be obviously formed between the timbers $l$ and $m$, through which the two chambers $a$ and $k$ may communicate the one with the other. To govern this communication, however, my invention contemplates providing a series of troughs $n$, connected preferably by one or more strips $p$, the troughs being made laterally movable. Being thus connected together they may all be moved laterally together, if desired, by any suitable device, as by a lever $q$, fulcrumed at one side of the apartment $k$, as indicated at $r$. It will readily be seen that by operating the lever $q$ the whole series of troughs $n$ may be moved laterally. I also design to make said troughs vertically movable in any suitable manner, so that they may be closed up snugly against the corresponding timbers $l$. This may be accomplished, for example, by means of suitable levers, (indicated at $s$.) It is obvious that by manipulating said levers $s$, which may bear against corresponding strips $p$, the troughs may all be lifted up against the timbers $l$ thereabove. When so elevated, the troughs will obviously close the communication between the apartments $a$ and $k$. When the troughs are let down, communication will be opened between said apartments. If the troughs are let straight down without being moved laterally, it will be apparent that any water dripping from the chamber $a$ between the timbers $l$ would fall into the troughs, and from thence the water may be carried to a waste-trough, (indicated at $t$.) The apartment $k$ might be kept in a more or less moist condition by simply dropping the troughs $n$ without moving them laterally. If it is desired, however, that water shall drip into and through the chamber $k$, the troughs $n$ may be moved laterally, as indicated, for example, in Fig. 2, in such position that the water dripping from the chamber $a$ may descend past the troughs and upon the floor of the apartment $k$. The water may thus be allowed to drip upon certain articles within the chamber $k$ and may be allowed to collect in the bottom of the chamber $k$, so as to stand about any product which may be located upon the floor, as cans of milk, for example. In Fig. 1 the troughs are shown as formed of metal suitably shaped, while in Fig. 2 they are shown formed as of boards or strips $u$, which may be provided with edged flanges $v$, so constructed that when the troughs are moved upward against the corresponding timbers $l$ the edged flanges $v$ will firmly contact with the corresponding surfaces of said timbers. The troughs $n$ may rest upon suitable supporting-timbers $w$. The troughs $n$ (indicated in Fig. 2) are shown formed with grooves $x$ to facilitate the running off of the water.

In icing the chamber $a$ it will be understood that the troughs $n$ are closed up to cut off communication between the chambers $a$ and $k$. The ice within the chamber $a$ will be supported upon the strips $m$.

By the means above described it will be clearly seen that the chamber $k$ may either be kept dry or moist or cold water be allowed to drip therethrough, as may be required.

A waste-pipe $y$ may lead from the base of the chamber $k$. The top of the chamber $b$ may be made with open-work, preferably constructed the same as the flooring between the chambers $a$ and $k$, the numeral 1 indicating timbers corresponding to the timbers $l$, the numeral 2 indicating cross timbers or strips conforming to strips $m$, while troughs are indicated at the numeral 3 corresponding to the troughs $n$. Said troughs are connected by a strip 4, any suitable means being employed to move the troughs 3 laterally and to close them up against corresponding timbers 1. If water is desired to drip within the chamber $b$, the troughs will be moved laterally, or if water is to be excluded from the chamber $b$ the troughs will be moved up against the timbers 1.

In icing the chamber $a$ I prefer to open the troughs 3 and let ice accumulate in the bottom of the chamber $b$—say to the depth of one and a half feet—inasmuch as by so doing I can reduce the temperature eight or ten degrees more within the chamber $b$, and the ice so formed in the floor of the said chamber keeps warm air from coming up from beneath or from the chamber $k$. The chamber $b$, as will be seen, will be kept cold by being surrounded with ice, or moisture may be allowed to drip thereinto, as above explained.

Flues 5 are formed at one side of the chamber $a$, into which the chamber $k$ communicates, as indicated in Fig. 1, the flues 5 being communicable into the top of the chamber $a$, as indicated, the communication being governed by traps or dampers 6. In this way a circulation of air may be provided through the chambers *a* and *k*.

What I claim as my invention is—

1. In a cold-storage system, the combination of an ice-chamber, the cooling-chamber therebelow communicable one with the other, and a series of horizontally-reciprocatory troughs beneath the base of the ice-chamber, substantially as set forth.

2. In a cold-storage system, the combination of an ice-chamber, a cooling-chamber therebelow communicable the one with the other, and a series of troughs to control said communication reciprocatory in vertical and in horizontal planes, and means to simultaneously reciprocate said troughs, substantially as set forth.

3. In a cold-storage system, the combination of an ice-chamber, a cooling-chamber therebelow, an open floor between said chambers, and a series of vertically and horizontally reciprocatory troughs to control said communication, substantially as set forth.

4. In a cold-storage system, the combination of an ice-chamber, an apartment therebelow, a water-distributing device located in said apartment and communicating with said ice-chamber, a cooling-chamber beneath the ice-chamber and communicating therewith, joists located between the cooling-chamber and the ice-chambers, troughs located below said joists to control said communication, and means to reciprocate said troughs horizontally and vertically, for the purpose described.

5. In a cold-storage system, the combination of an ice-chamber, a cooling-chamber therebelow communicable the one with the other, an apartment above the ice-chamber, a water-distributing device in said apartment and communicating into the ice-chamber, a series of horizontally-adjustable troughs to control the communication of the ice-chamber with the cooling-chamber, a flue opening at one end into the cooling-chamber and at the other end into the ice-chamber, whereby an air circulation between said chambers may be effected, and means to control said air circulation, substantially as set forth.

6. In a cold-storage system, the combination of two chambers provided with joists therebetween, and the one communicable with the other, a series of troughs located below said joists to control said communication, and a laterally-reciprocatory slide connecting said troughs, substantially as set forth.

7. In a cold-storage system, the combination of an ice-chamber, a refrigerating-chamber located therewithin provided with an open top communicable with the ice-chamber, and a series of vertically-adjustable troughs reciprocatory in a horizontal plane to govern the communication of the refrigerating-chamber through the top thereof with the ice-chamber, substantially as set forth.

8. In a cold-storage system, an ice-chamber, a cooling-chamber therebelow communicable the one with the other, troughs to control said communication whereby dry or wet storage may be secured in the cooling-chamber at the will of the operator, said troughs being simultaneously reciprocatory in lateral and in vertical planes, substantially as set forth.

In testimony whereof I sign this specification in the presence of two witnesses.

ARTEMUS J. TIBBITS.

Witnesses:
N. S. WRIGHT,
M. HICKEY.